(12) United States Patent
Seo

(10) Patent No.: US 12,339,534 B2
(45) Date of Patent: Jun. 24, 2025

(54) DISPLAY APPARATUS AND MANUFACTURING METHOD OF THE SAME

(71) Applicant: HYUNDAI MOBIS CO., LTD., Seoul (KR)

(72) Inventor: Jun Seong Seo, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 18/616,835

(22) Filed: Mar. 26, 2024

(65) Prior Publication Data

US 2025/0076695 A1    Mar. 6, 2025

(30) Foreign Application Priority Data

Sep. 1, 2023    (KR) .................. 10-2023-0116215

(51) Int. Cl.
*G02F 1/1333*    (2006.01)

(52) U.S. Cl.
CPC .. *G02F 1/133331* (2021.01); *G02F 1/133322* (2021.01)

(58) Field of Classification Search
CPC .................. G02F 1/133331; G02F 1/133322
USPC ..................................... 349/58–65
See application file for complete search history.

(56) References Cited

U.S. PATENT DOCUMENTS

| | | | |
|---|---|---|---|
| 2012/0262907 A1* | 10/2012 | Lee ................... | H05K 5/02 361/807 |
| 2015/0301266 A1* | 10/2015 | Araki ................. | G02B 6/005 362/606 |
| 2019/0146264 A1* | 5/2019 | Takeuchi ............ | G02B 6/0085 349/58 |

FOREIGN PATENT DOCUMENTS

KR    10-2013-0001647 A    1/2013

* cited by examiner

*Primary Examiner* — Charles S Chang
(74) *Attorney, Agent, or Firm* — Morgan, Lewis & Bockius LLP

(57) ABSTRACT

Provided is a display apparatus and a manufacturing method of the same. The display apparatus according to the present disclosure includes a support panel including a first panel, a second panel spaced apart from the first panel, and a connection panel arranged between the first panel and the second panel; a display module arranged to face the front surface of the support panel; a rear cover arranged to face the rear surface of the support panel; a first fixing member provided between the support panel and the display module and configured to fix the display module to the support panel; and a second fixing member provided between the support panel and the rear cover and configured to fix the rear cover to the support panel.

15 Claims, 18 Drawing Sheets

DISPLAY APPARATUS AND MANUFACTURING METHOD OF THE SAME

CROSS-REFERENCE TO RELATED APPLICATION

This application claims priority from and the benefit of Korean Patent Application No. 10-2023-0116215, filed on Sep. 1, 2023, which is hereby incorporated by reference for all purposes as if set forth herein.

BACKGROUND

Technical Field

Exemplary embodiments of the present disclosure relate to a display apparatus and a manufacturing method of the same using a press method.

Discussion of the Background

In recent years, vehicular displays have been increasingly slimmer and larger due to LCD modules becoming slimmer and OLED panels. In order to adopt such a slim display structure, efforts have been made to ensure the rigidity of displays by applying a metal structure, which is manufactured using die casting, to the interior of displays.

However, in a typical die casting process, an object to be cast is melted in molten metal and then put into a mold for production. Accordingly, a display may contain excessive gas inside, resulting in a gas porosity defect in its surface.

The related art of the present disclosure is disclosed in Korean Patent Publication No. 10-2013-0001647 (published on Jan. 4, 2013 and entitled "LIQUID CRYSTAL DISPLAY".)

SUMMARY

An object of the present disclosure is to provide a display apparatus and a manufacturing method of the same using a press method.

According to an aspect of the present disclosure, there is provided a display apparatus includes: a support panel including a first panel, a second panel spaced apart from the first panel, and a connection panel arranged between the first panel and the second panel; a display module arranged to face the front surface of the support panel; a rear cover arranged to face the rear surface of the support panel; a first fixing member provided between the support panel and the display module and configured to fix the display module to the support panel; and a second fixing member provided between the support panel and the rear cover and configured to fix the rear cover to the support panel.

The display module may include: a display panel configured to face the second panel; a cover glass stacked on the display panel and configured to face the first panel. The first fixing member may be arranged between the cover glass and the second panel. Both sides of the first fixing member may be attached to the cover glass and the second panel, respectively.

The second fixing member may include: a fixing plate configured to extend from the first panel; a fixing hole configured to penetrate the connection panel and surround the fixing plate; and a hook configured to extend from the rear cover, inserted into the fixing hole, and latch-coupled to the fixing plate.

The first panel may be arranged behind the second panel. The connection panel may include: a first connection panel connected to the second panel; and a second connection panel configured to extend from the first connection panel and connected to the first panel.

The fixing hole may include an insertion hole configured to penetrate the first connection panel; and an extension hole configured to extend from the insertion hole and configured to penetrate the second connection panel.

An end of the fixing plate may be arranged inside the insertion hole.

A pair of the extension holes may be provided. The pair of the extension holes may be arranged to surround both side surfaces of the fixing plate, respectively.

The hook may be provided to be elastically deformable.

The second fixing member may further include a fixing tape arranged between the first panel and the rear cover. Both sides of the fixing tape may be attached to the first panel and the rear cover, respectively.

The display apparatus may further include a pad arranged between the support panel and the rear cover and provided to be elastically deformable.

The pad may include an anti-snag pad; and a sealing pad configured to extend from the anti-snag pad and coming into the contact with the second panel.

The support panel may further include a third panel protruding backward from the front surface of the first panel. The display apparatus may further include a pair of slits configured to penetrate the third panel; a bridge arranged between the pair of the slits and configured to protrude backward from the front surface of the third panel; and a ground member fixed to the bridge and connected to the display module.

The ground member may include: a ground bracket arranged to face the bridge; an anti-rotation hook configured to extend from the ground bracket and fixed to the bridge to prevent rotation of the ground bracket; and a ground screw configured to penetrate the ground bracket and connected to the display module.

According to an aspect of the present disclosure, there is provided a manufacturing method of a display apparatus includes: preparing a plate including a first region, a second region arranged to surround the first region, and a third region arranged between the first region and the second region; forming a fixing hole and a fixing plate by perforating the third region; forming a support panel by pressing the first region; arranging a first fixing member between the front surface of the support panel and the display module; coupling the support panel and the display module by pressing the display module toward the front surface of the support panel; arranging a pad between a rear surface of the support panel and a rear cover; and coupling the hook and the fixing plate by pressing the rear cover toward the rear surface of the support panel.

The manufacturing method may further include: after said forming a support panel by pressing the first region, forming a pair of slits by perforating a fourth region located inside the first region; forming a bridge by pressing a region between the pair of the slits; and fastening a ground bracket to the bridge.

The manufacturing method may further include: after said coupling the support panel and the display module, connecting a ground screw to the display module.

According to the present disclosure, the display apparatus and the manufacturing method of the same provide a support panel structure to which a press or drawing method can be applied. Such a structure prevents a display apparatus surface from undergoing a quality deterioration caused by using a conventional die casting method and enables a slimmer design to be realized.

In addition, according to the present disclosure, the display apparatus and the manufacturing method of the same provide a fixing hole, a slit, and a notching hole so as to prevent excessive deformation and damage, which occurs during a drawing process, to the display apparatus.

In addition, according to the present disclosure, the display apparatus and the manufacturing method of the same provide a pad to prevent a snag between a support panel and a rear cover caused by vibration, an impact, and the like and to prevent moisture or foreign substances from entering the product.

DETAILED DESCRIPTION OF THE ILLUSTRATED EMBODIMENTS

Figure 1:
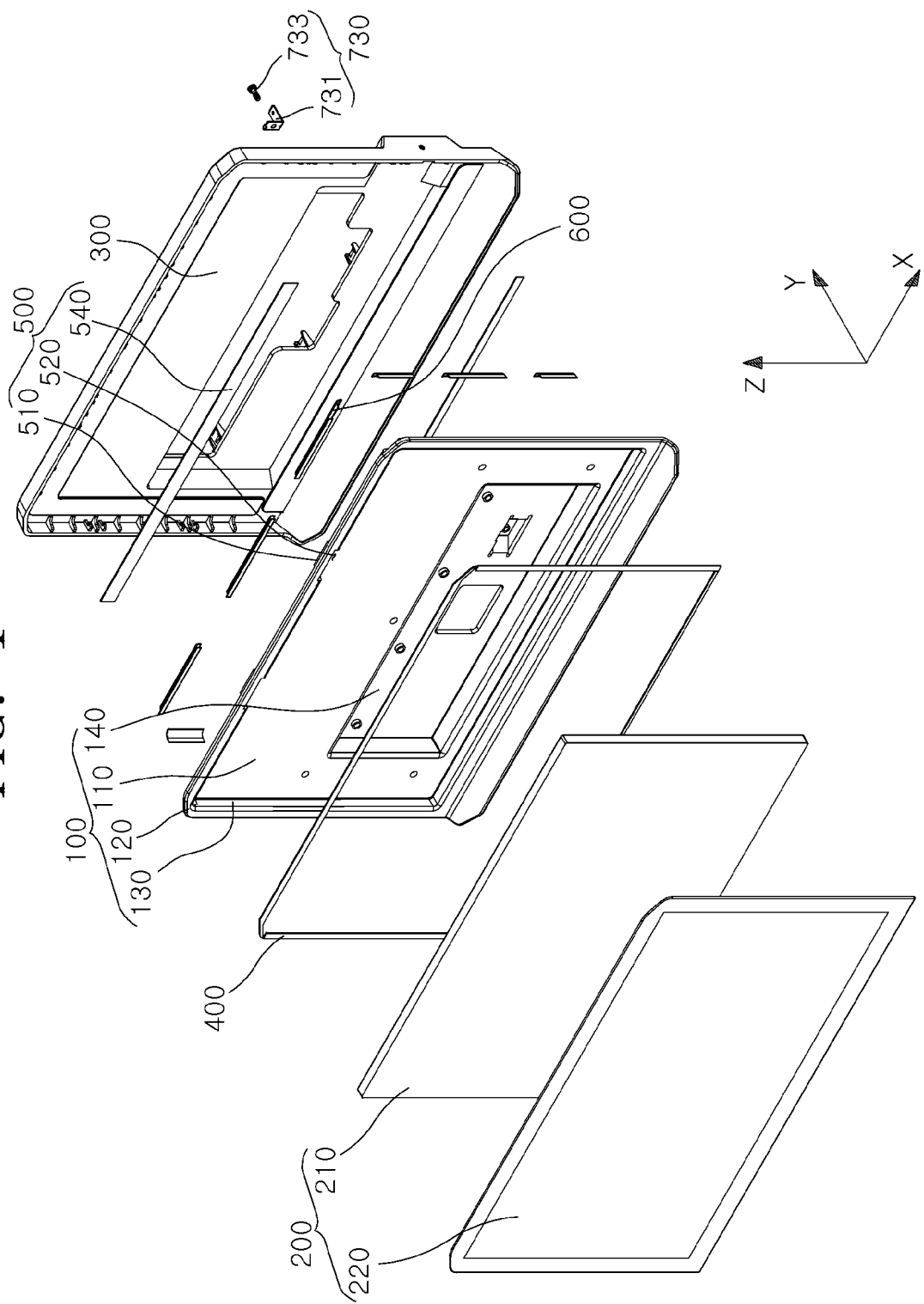
FIG. 1 is an exploded perspective view schematically illustrating the configuration of a display apparatus according to an embodiment of the present disclosure.

Exemplary embodiments of a display apparatus will be described below with reference to the accompanying drawings.

It should be considered that the thickness of each line or the size of each component in the drawings may be exaggeratedly illustrated for clarity and convenience of description. In addition, the terms as used herein are defined in consideration of functions of the present disclosure, and these terms may change depending on a user or operator's intention or practice. Therefore, definitions of these terms will have to be made based on the content herein.

In addition, in the present specification, when one element is described as being "connected (or coupled)" to another element, it may be "directly connected (or coupled)" to another element, or may be "indirectly connected (or coupled)" to another element with other elements interposed therebetween. In the present specification, when one element is described to "comprise (or include)" one element, this is not intended to preclude any other elements, but rather may further "comprise (or include)" other elements, unless specifically stated otherwise.

In addition, the same reference numerals may refer to the same elements herein. Even if the same or similar reference numerals are not mentioned or described in a particular drawing, such reference numerals may be described on the basis of other drawings. Similarly, even if one element is not identified by a reference numeral in a particular drawing, the element may be described on the basis of other drawings. In addition, the number, shape, size, and relative differences in size of constituent elements, and the like illustrated in the drawings of the present disclosure are set for ease of understanding. Embodiments are not limited thereto, and may be implemented in various forms.

Figure 2:
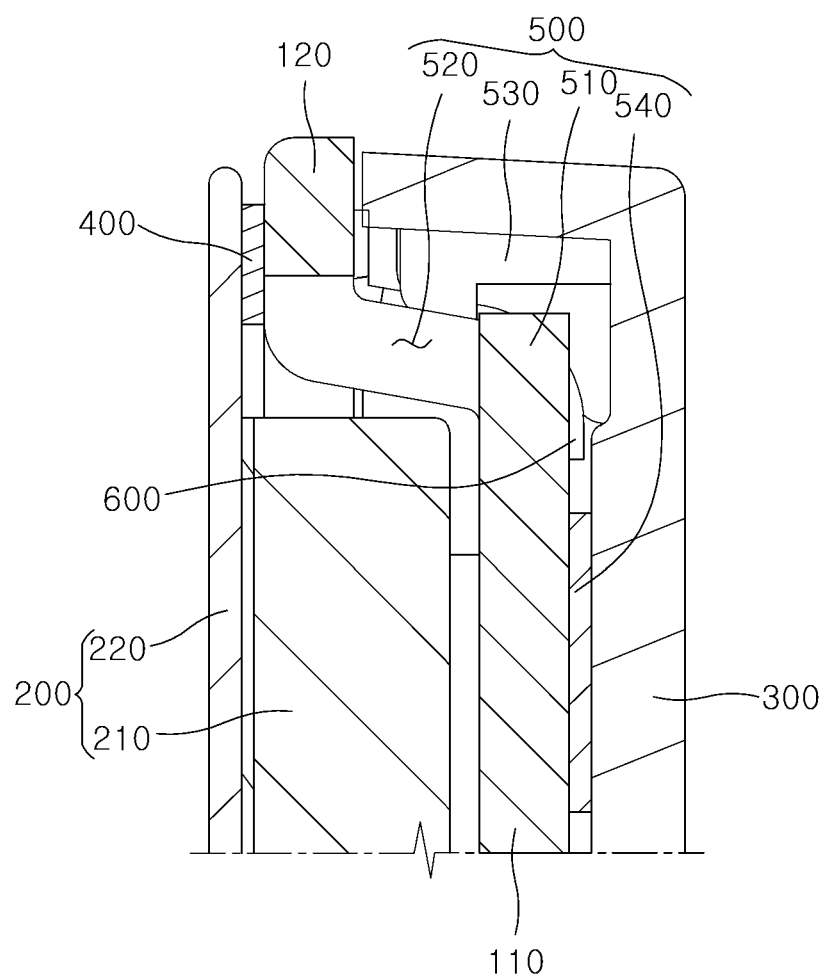
FIGS. 2 and 3 are a cross-sectional view schematically illustrating the configuration of the display apparatus according to an embodiment of the present disclosure.
Figure 3:
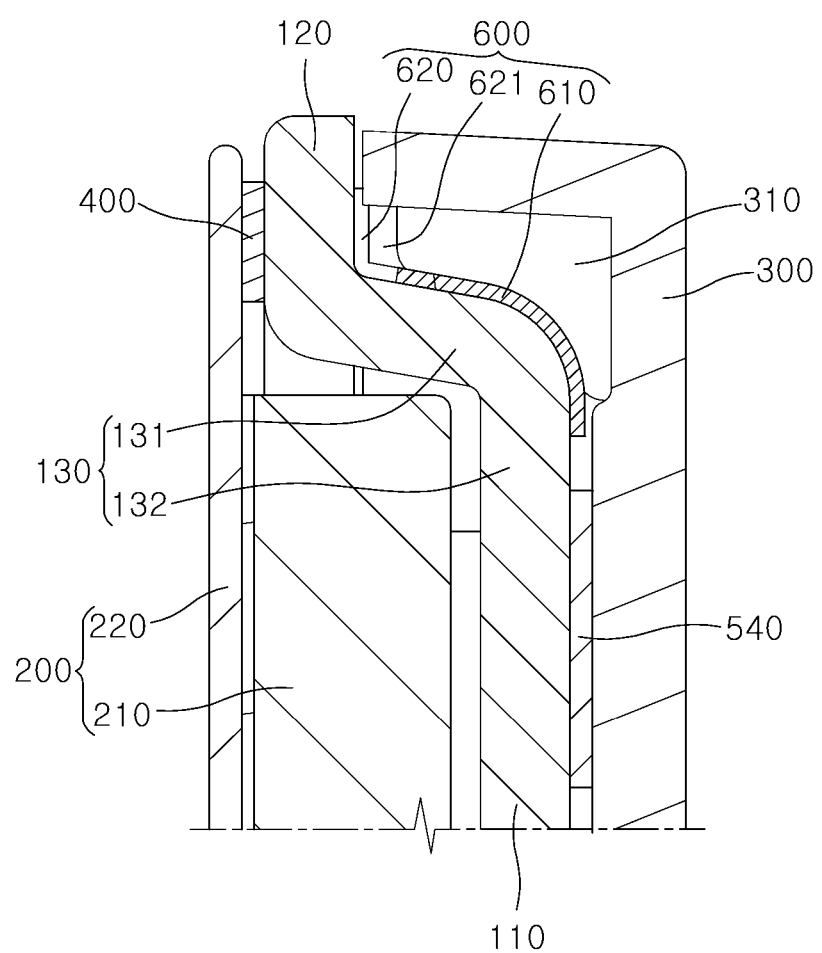

FIG. 1 is an exploded perspective view schematically illustrating the configuration of a display apparatus according to an embodiment of the present disclosure. FIGS. 2 and 3 are a cross-sectional view schematically illustrating the configuration of the display apparatus according to an embodiment of the present disclosure.

Referring to FIGS. 1 to 3, the display apparatus according to the present embodiment may include a support panel 100, a display module 200, a rear cover 300, a first fixing member 400, and a second fixing member 500.

The support panel 100 may function as an element that supports the display module 200 and the rear cover 300 as a whole, which will be described later. A front surface of the support panel 100 may be arranged to face the display module 200, and may provide a space where the display module 200 may be seated. A rear surface of the support panel 100 may be arranged to face the rear cover 300, which will be described later, and may provide a space where the rear cover 300 may be seated. The support panel 100 may be formed of a material having high rigidity, such as metal, to prevent damage caused by an impact, a load, and the like applied from the outside.

Hereinafter, a longitudinal direction of the support panel 100 may refer to a direction parallel to the X-axis with respect to FIG. 1. A height direction of the support panel 100 may refer to a direction parallel to the Z-axis with respect to FIG. 1. A thickness direction of the support panel 100 may refer to a direction parallel to the Y-axis with respect to FIG. 1. A thickness direction of the support panel 100 may refer to a direction in which the front and rear surfaces of the support panel 100 are perpendicularly penetrated.

Figure 4:
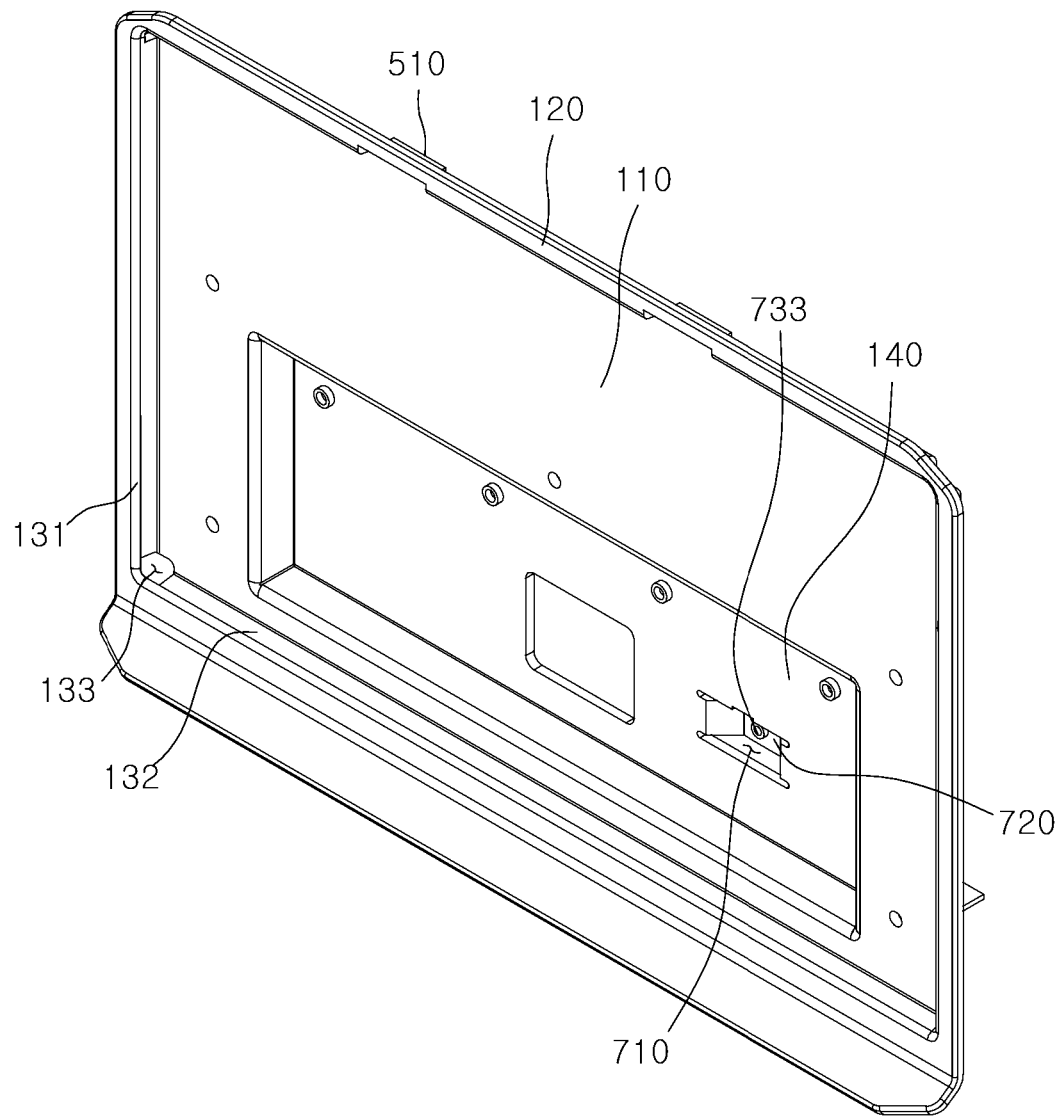
FIG. 4 is a perspective view schematically illustrating the configuration of a support panel according to an embodiment of the present disclosure.
Figure 5:
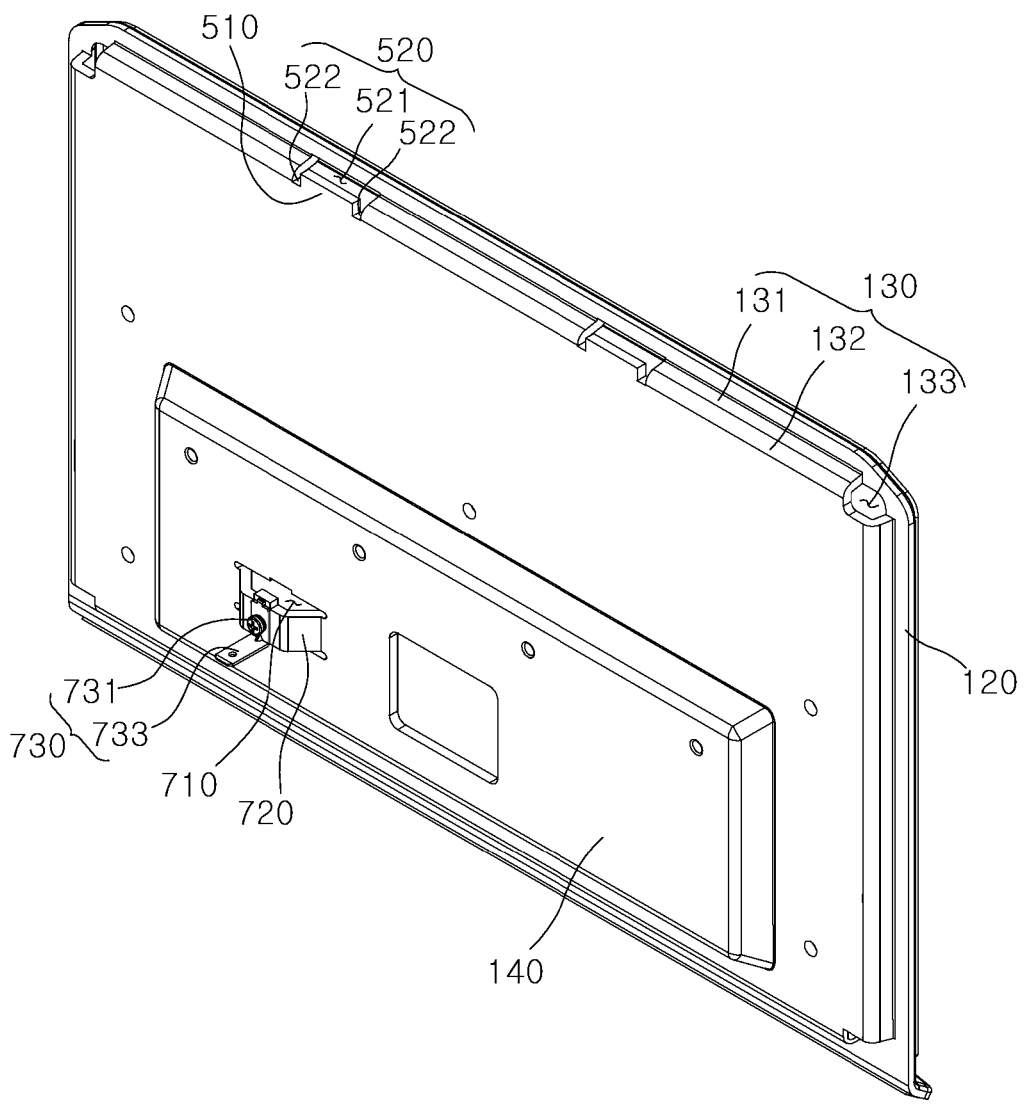
FIG. 5 is a perspective view illustrating the configuration of the support panel when viewed from a different viewpoint than that of FIG. 4 according to an embodiment of the present disclosure.

FIG. 4 is a perspective view schematically illustrating the configuration of a support panel according to an embodiment of the present disclosure. FIG. 5 is a perspective view illustrating the configuration of the support panel when viewed from a different viewpoint than that of FIG. 4 according to an embodiment of the present disclosure.

Referring to FIGS. 1 to 5, the support panel 100 may include a first panel 110, a second panel 120, and a connection panel 130.

The first panel 110 may form an exterior appearance of a center portion of the support panel 100. The first panel 110 may be formed to have a flat plate shape having a front surface and a rear surface.

The second panel 120 may form an exterior appearance of the edge region of the support panel 100. The second panel 120 may be formed to have a plate shape with a hollow formed in the center portion. The second panel 120 may be arranged, along a front-rear direction, that is, a thickness direction of the support panel 100, to be spaced apart from the first panel 110. That is, as illustrated in FIGS. 4 and 5, the second panel 120 may be arranged in front of the first panel 110. The first panel 110 may be arranged to face the hollow formed in the center portion of the second panel 120.

The connection panel 130 may be arranged between the first panel 110 and the second panel 120, and may function as an element that connects the first panel 110 and the second panel 120. The connection panel 130 may be arranged to surround the entire perimeter of the first panel 110. The connection panel 130 may be integrally formed with the first panel 110 and the second panel 120, or may be manufactured separately from the first panel 110 and the second panel 120 and then connected to the first panel 110 and the second panel 120 by welding or the like.

The connection panel 130 may include a first connection panel 131 and a second connection panel 132.

The first connection panel 131 may form an exterior appearance of one side of the connection panel 130, and may be connected to the second panel 120. More specifically, one end of the first connection panel 131 may be connected to the rear surface of the second panel 120. The other end of the first connection panel 131 may protrude a predetermined distance backward from the rear surface of the second panel 120.

The second connection panel 132 may form an exterior appearance of the other side of the connection panel 130, and may be connected to the first panel 110. More specifically, one end of the second connection panel 132 may be connected to the other end of the first connection panel 131, which protrudes the predetermined distance backward from the rear surface of the second panel 120. The other end of the second connection panel 132 may extend in a curved manner from the first connection panel 131 toward the peripheral surface of the first panel 110. In this case, the second connection panel 132 may be designed in a manner that varies in curvature depending on the distance between the first panel 110 and the second panel 120. The other end of the second connection panel 132 may be connected to the peripheral surface of the first panel 110. The second connection panel 132 may be formed to be curved with a predetermined curvature during a drawing process in which the first panel 110 is pressed backward.

The connection panel 130 may further include a notching hole 133.

The notching hole 133 may be formed to have a hole shape configured to penetrate a corner portion of the connection panel 130, which is arranged to surround the entire perimeter of the first panel 110. The number of notching holes 133 may be the same as the number of the corners of the connection panel 130. Accordingly, the notching holes 133 may cause the connection panel 130 to be more smoothly deformed during the drawing process of the first panel 110.

The connection panel 100 may further include a third panel 140.

The third panel 140 may protrude backward from a front surface of the first panel 110. The front surface of the third panel 140 may be formed to be concavely recessed backward from the front surface of the first panel 110. The front surface of the third panel 140 may be formed to have a smaller area than the front surface of the first panel 110. The third panel 140 may be formed through a drawing process in which a portion of the first panel 110 is pressed backward.

The display module 200 may be arranged to face the front surface of the support panel 100, and may output image information. The display module 200 may be fixed to the support panel 100 with the first fixing member 400, which will be described later, in between.

The display module 200 may include a display panel 210 and a cover glass 220.

The display panel 210 may be a liquid crystal display (LCD). However, the display panel 210 is not limited thereto, and may also be a reflective display, an E-ink display, a passive-matrix organic light-emitting diode (PMOLED), and an active-matrix organic light-emitting diode (AMOLED). The display panel 210 may be arranged in a manner that the rear surface thereof faces the front surface of the first panel 110. With the display panel 210 seated on the front surface of the first panel 110, the display panel 210 may be arranged in a manner that the peripheral surface thereof faces the inner surface of the connection panel 130. The display panel 210 may output image information through the front surface. The front surface of the display panel 210 may be configured to receive touch input. A control module (not illustrated), which is electrically connected to the vehicle battery (not illustrated), Electric Control Unit (ECU), and the like by means of connectors, wiring, and the like, may be installed on the rear surface of the display panel 210. With the display panel 210 seated on the front surface of the first panel 110, the control module may be inserted into the third panel 140.

The cover glass 220 may be stacked on the front surface of the display panel 210, and may protect the display panel 210 from an external impact, foreign substances, and the like. The cover glass 220 may be made of a transparent material having a certain level of transmittance. The cover glass 220 may be made of glass or a transparent plastic material that has a uniform thickness and transmittance at and above a certain level. For instance, the cover glass 220 may be tempered glass or thin glass with a protective film applied thereto.

The cover glass 220 may be formed to have a larger diameter than the display panel 210. Accordingly, the edge region of the cover glass 220 may protrude toward the outside of the front surface of the display panel 210, and may be arranged to face the front surface of the second panel 120.

The rear cover 300 may be arranged to face the rear surface of the support panel 100, and may support the support panel 100 against a vehicle instrument panel (not illustrated). The rear cover 300 may be formed to have a box shape with an empty interior and an open front surface. The support panel 100 may be inserted into the rear cover 300 with the rear surface of the support panel 100 arranged to face the front surface of the rear cover 300. In this case, the rear cover 300 may be arranged in a manner that the inner peripheral surface thereof faces the front surface of the first panel 130. In addition, the rear cover 300 may be arranged in a manner that the front surface of the edge region thereof faces the rear surface of the second panel 120. The rear cover 300 may be fixed to the support panel 100 with the second fixing member 500, which will be described later, in between. The rear surface of the rear cover 300 may be connected to the vehicle instrument panel by various coupling methods such as bolting, welding, and fitting, and the like.

A plurality of the pressurization ribs 310 may be formed on an inner corner of the rear cover 300. The plurality of the pressurization ribs 310 may be arranged to be spaced predetermined distances apart from each other along the extension direction of the connection panel 130. The contact surface of the pressurization rib 310 coming in contact with the pad 600 may be formed to be curved with a curvature corresponding to a curvature of the connection panel 130.

The first fixing member 400 may be provided between the support panel 100 and the display module 200, and may fix the display module 200 to the support panel 100. The first fixing member 400 may be a double-sided tape having an adhesive material applied to both sides of a foam sheet (not illustrated). The foam sheet may include at least one of the followings: polystyrene, polyurethane, polyvinyl chloride, acrylate, olefin, rubber, and a combination thereof. The adhesive material applied to the foam sheet may be an acrylic-based adhesive, or may be a rubber-based adhesive, a vinyl alkyl ether-based adhesive, a silicone-based adhesive, a polyester-based adhesive, a polyamide-based adhesive, a urethane-based adhesive, a fluorine-based adhesive, an epoxy-based adhesive, or a combination thereof.

The first fixing member may be arranged between the cover glass 220 and the second panel 120. Both sides of the first fixing member 400 may be attached to the rear surface of the cover glass 220 and the front surface of the second panel 120, respectively. The first fixing member 400 may be formed to have a strip shape with a hollow formed in the center portion thereof. The first fixing member 400 may be formed to have a smaller area than the front surface of the second panel 120. Accordingly, the first fixing member 400 may be prevented from interfering with the display panel 210. The first fixing material 400 has been described thus far using the example of being arranged between the cover glass 220 and the second panel 120. However, the first fixing material 400 is not limited thereto, and may also be arranged between the display panel 210 and the first panel 110.

The second fixing member 500 may be provided between the support panel 100 and the rear cover 300, and may fix the rear cover 300 to the support panel 100.

The second fixing member 500 may include a fixing plate 510, a fixing hole 520, and a hook 530.

Figure 6:
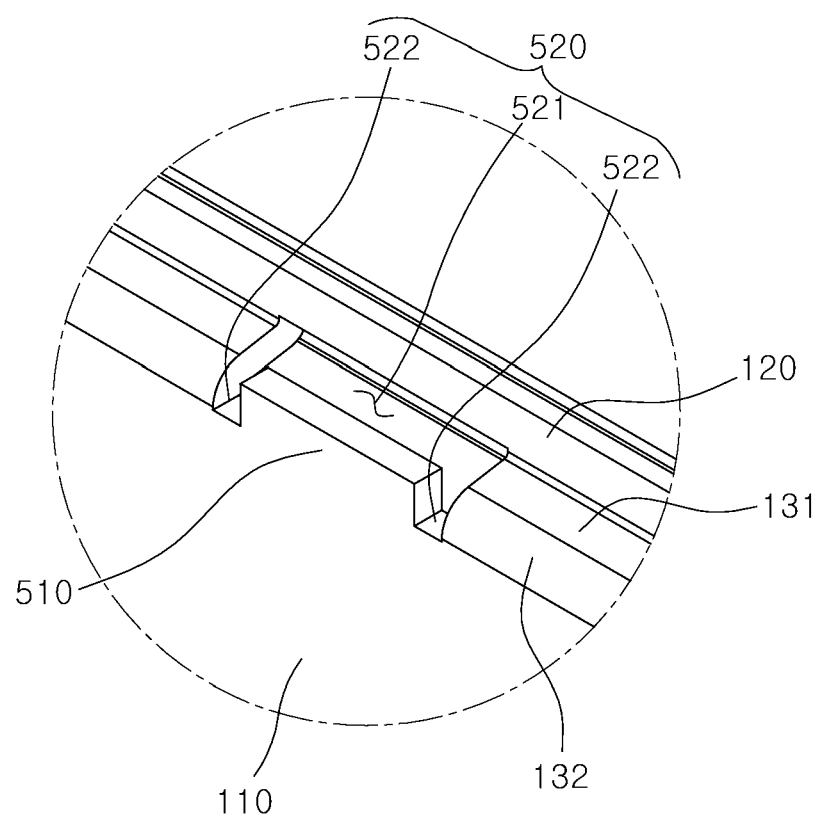
FIG. 6 is an enlarged perspective view schematically illustrating the configuration of a fixing hole and a fixing plate according to an embodiment of the present disclosure.
Figure 7:
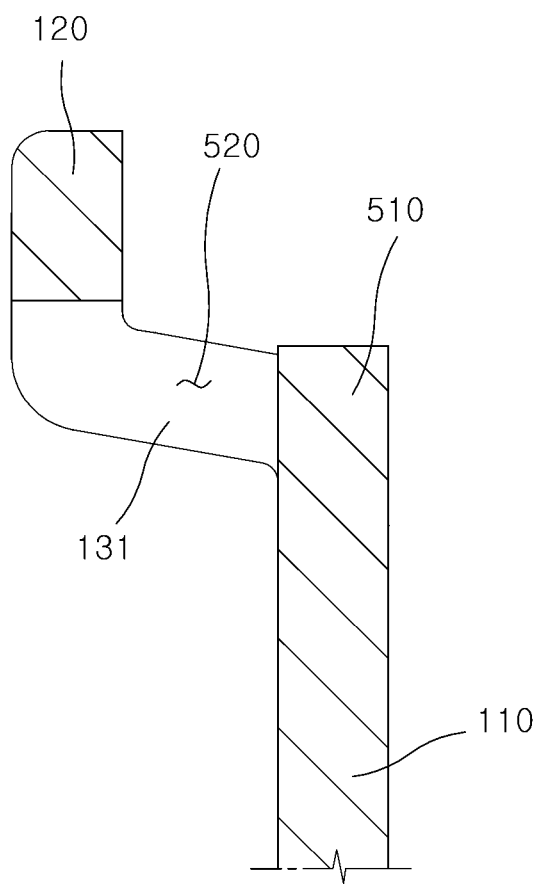
FIG. 7 is a cross-sectional view schematically illustrating the configuration of the fixing hole and the fixing plate according to an embodiment of the present disclosure.
Figure 8:
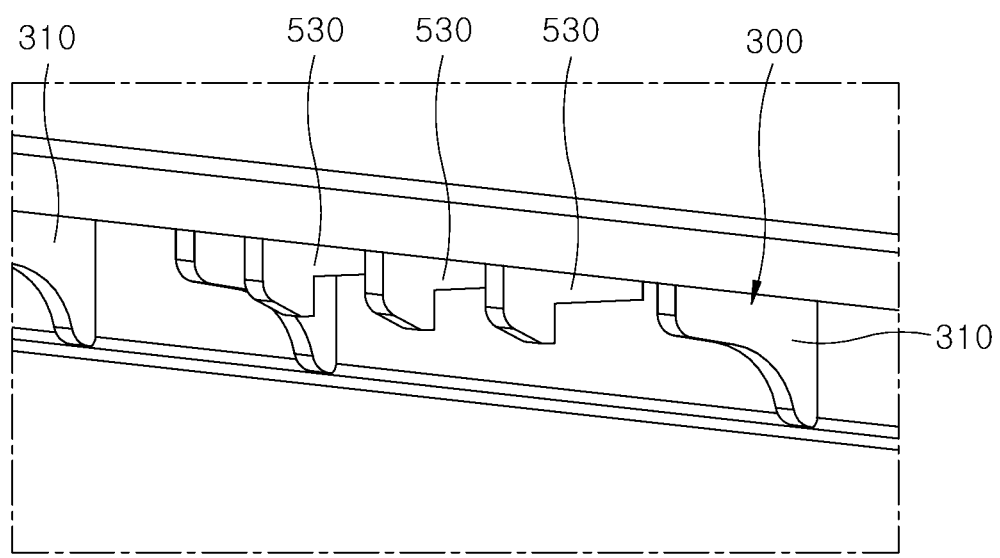
FIG. 8 is an enlarged perspective view schematically illustrating the configuration of a hook according to an embodiment of the present disclosure.

FIG. 6 is an enlarged perspective view schematically illustrating the configuration of a fixing hole and a fixing plate according to an embodiment of the present disclosure. FIG. 7 is a cross-sectional view schematically illustrating the configuration of the fixing hole and the fixing plate according to an embodiment of the present disclosure. FIG. 8 is an enlarged perspective view schematically illustrating the configuration of a hook according to an embodiment of the present disclosure.

Referring to FIGS. 6 and 7, the fixing plate 510 may be formed to have a plate or bar shape configured to extend from the peripheral surface of the first panel 110 to the outside of the first panel 110. The fixing plate 510 may be arranged parallel to the first panel 110. An end of the fixing plate 510 may be latch-coupled to the hook 530, which will be described later. The fixing plate 510 may be integrally formed with the first panel 110, or alternatively, may be manufactured separately from the first panel 110 and combined with the first panel 110. A plurality of the fixing plates 510 may be provided. The plurality of the fixing plates 510 may be arranged to be spaced predetermined distances apart from each other along the peripheral surface of the first panel 110. In FIG. 5, the fixing plates 500 are illustrated as an example of being formed only on the top surface of the first panel 110. However, the fixing plates 510 are not limited thereto, and may also be formed on a side or bottom surface of the first panel 110.

The fixing hole 520 may be configured to penetrate the connection panel 130, and may be arranged to surround the fixing plate 510.

The fixing hole 520 may include an insertion hole 521 and an extension hole 522.

The insertion hole 521 may have a hole shape formed by perpendicularly penetrating the first connection panel 131. The insertion hole 521 may function as an element that provides a space inside the first connection panel 131, which will be described later. An end of the hook 530, which will be described later, may be inserted into the space. The insertion hole 521 may be arranged to surround the end of the fixing plate 510 configured to extend from the first panel 110. In this case, the end of the fixing plate 510 may be arranged inside the insertion hole 521. That is, the hook 530 may thus be inserted into the insertion hole 521 more smoothly than when the fixing plate 510 protrudes toward the outside of the insertion hole 521.

The extension hole 522 may have a hole shape formed by perpendicularly penetrating the second connection panel 132. A pair of the extension holes 522 may be provided. The pair of the extension holes 522 may extend from both ends of the insertion hole 521, respectively. The pair of the extension holes 522 may be arranged to surround both side surfaces of the fixing plate 510, respectively. Accordingly, the extension holes 522 may separate the side surfaces of the fixing plate 510 from the connection panel 130, thereby preventing the fixing plate 510 from being deformed or damaged during the drawing process of the first panel 110.

Referring to FIG. 8, the hook 530 may extend forward from the front surface of the rear cover 300. The rear cover 300 may be seated on the rear surface of the support panel 100. Accordingly, the hook 530 may be inserted into the fixing hole 520, more specifically, into the insertion hole 521. With the hook 530 inserted into the insertion hole 521, the hook 530 may be latch-coupled to the fixing plate 510. For the latch-coupling with the fixing plate 510, the end of the hook 530 may be bent and form a loop shape. The hook 530 may be provided to be elastically deformable. Accordingly, in the process of the rear cover 300 being seated on the rear surface of the support panel 100, the hook 530 may elastically deform itself by coming into contact with the fixing plate 510, and may be inserted into the insertion hole 521 more smoothly.

A plurality of the hooks 530 may be provided. The plurality of the hooks 530 may be arranged to be spaced predetermined distances apart from each other along the inner peripheral surface of the rear cover 300. At least one hook 530 may be latch-coupled to any one fixing plate 510.

The second fixing member 500 may further include a fixing tape 540.

The fixing tape 540 may be a double-sided tape having an adhesive material applied to both sides of a foam sheet (not illustrated). The foam sheet may include at least one of the followings: polystyrene, polyurethane, polyvinyl chloride, acrylate, olefin, rubber, and a combination thereof. The adhesive material applied to the foam sheet may be an acrylic-based adhesive, or may be a rubber-based adhesive, a vinyl alkyl ether-based adhesive, a silicone-based adhesive, a polyester-based adhesive, a polyamide-based adhesive, a urethane-based adhesive, a fluorine-based adhesive, an epoxy-based adhesive, or a combination thereof. The fixing tape 540 may be arranged between the rear surface of the first panel 110 and the front surface of the rear cover 300. Two opposite sides of the fixing tape 540 may be attached to the rear surface of the first panel 110 and the front surface of the rear cover 300, respectively.

The display apparatus according to the present embodiment may further include the pad 600.

The pad 600 may be arranged between the support panel 100 and the rear cover 300. The pad 600 may function as an element that absorbs an impact generated between the support panel 100 and the rear cover 300 and prevents foreign substances, moisture, and the like from entering the space between the support panel 100 and the rear cover 300. The pad 600 may be provided to be elastically deformable. For instance, the pad 600 may be formed of a flexible material such as rubber or silicone.

The pad 600 may include an anti-snag pad 610 and a sealing pad 620.

The anti-snag pad 610 may form the exterior appearance of one side of the pad 600, and may function as an element that prevents noise and damage caused by direct contact between the support panel 100 and the rear cover 300. The anti-snag pad 610 may be arranged between the connection panel 130 and the rear cover 300. An inner surface of the anti-snag pad 610 may come into contact with the outer surface of the connection panel 130. In this case, two sides of the anti-snag pad 610 may be arranged to cover outer surfaces of the first connection panel 131 and the second connection panel 132, respectively. The rear cover 300 may be seated on the rear surface of the support panel 100. Accordingly, the pressurization rib 310, which formed on an inner corner of the rear cover 300, may press an outer surface of the anti-snag pad 610 toward the connection panel 130. Two sides of the anti-snag pad 610 may be brought into close contact with the connection panel 130 and the rear cover 300, respectively, by the pressurization force applied from the pressurization rib 310.

A plurality of the anti-snag pads 610 may be provided. The plurality of the anti-snag pads 610 may be arranged, along the extension direction of the connection panel 130, to be spaced predetermined distances apart from each other. More specifically, the plurality of the anti-snag pads 610 and the fixing plates 510 may be alternately arranged along the extension direction of the connection panel 130. Accordingly, the anti-snag pad 610 may be prevented from interfering with the hook 530 during fastening of the support panel 100 and the rear cover 300.

The sealing pad 620 may form the exterior appearance of the other side of the pad 600, and may function as an element that prevents foreign substances, moisture, and the like from entering the space between the support panel 100 and the rear cover 300. The sealing pad 620 may extend from one end of the anti-snag pad 610, which covers the outer surface of the first connection panel 131. An inner surface of the sealing pad 620 may come into contact with the rear surface of the second panel 120. The outer surface of the sealing pad 620 may come into contact with the front surface of the edge region of the rear cover 300. A sealing lip (not illustrated) may be additionally formed in a manner that protrudes from the sealing pad 620 to block the inflow path of foreign substances or moisture.

The display apparatus according to the present embodiment may further include a slit 710, a bridge 720, and a ground member 730.

Figure 9:
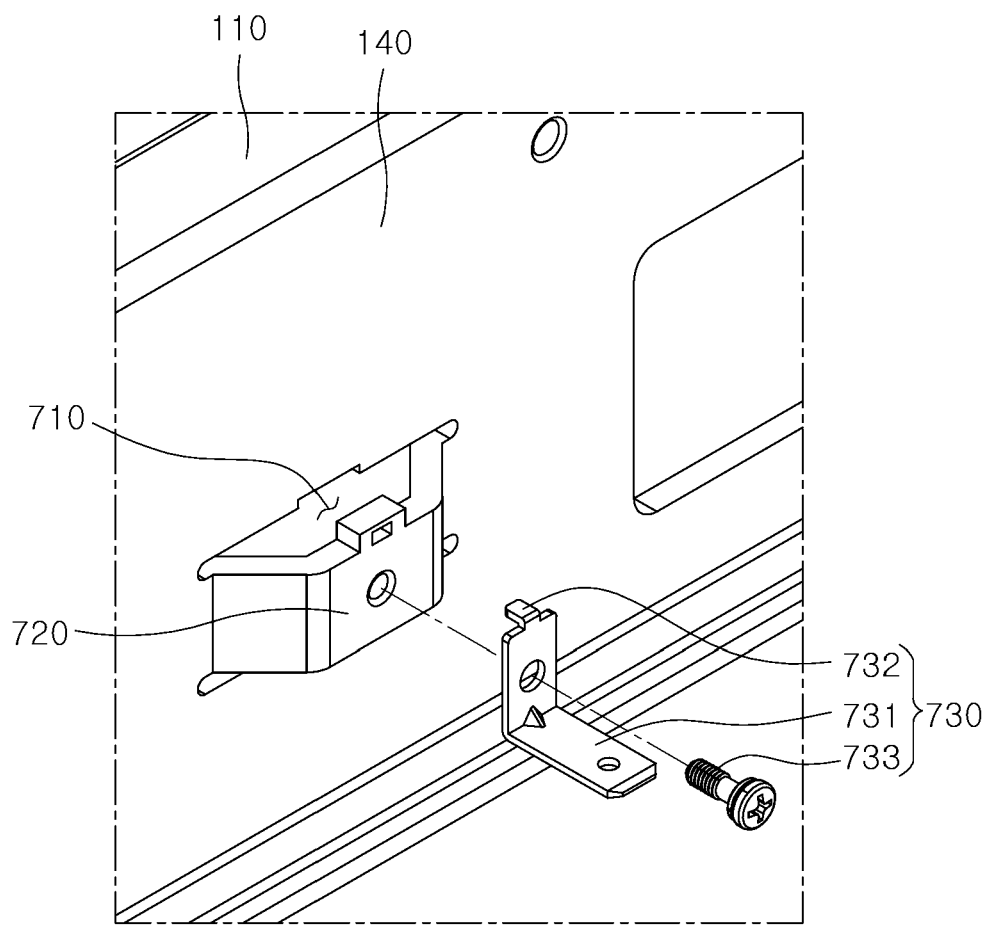
FIG. 9 is a perspective view schematically illustrating the configuration of a slit, a bridge, and a ground member according to an embodiment of the present disclosure.

FIG. 9 is a perspective view schematically illustrating the configuration of a slit, a bridge, and a ground member according to an embodiment of the present disclosure.

Referring to FIG. 9, the slit 710 may be formed to have a hole shape formed by perpendicularly penetrating the third panel 140 along the thickness direction of the support panel 100. The slit 710 may be arranged in a longitudinal direction parallel to the longitudinal direction of the support panel 100. A pair of the slits 710 may be provided. The pair of the slits 710 may be arranged, along the height direction of the support panel 100, to be spaced predetermined distances apart from each other. In this case, the pair of the slits 710 may be arranged parallel to each other.

The bridge 720 may be arranged between the pair of the slits 710, and may protrude backward from the front surface of the third panel 140. More specifically, the center portion of the bridge 720 may be arranged at a position spaced a predetermined distance backward apart from a rear surface of the third panel 140. Both ends of the bridge 720 may extend obliquely from the central portion of the bridge 720 and be integrally connected to the third panel 140. Both side surfaces of the bridge 720 may be separated from the third panel 140 by the pair of the slits 710. The bridge 720 may be formed by a drawing process in which the front surface of the third panel 140 is pressed with the third panel 140 perforated to form a pair of slits 710 therein.

The ground member 730 may be fixed to the bridge 720 and connected to the display module 200. The ground member 730 may function as an element that is electrically connected to the display module 200 and a ground connector (not illustrated), thereby ensuring ground performance for the display module 200.

The ground member 730 may include a ground bracket 731, an anti-rotation hook 732, and a ground screw 733.

The ground bracket 731 may be formed to have a plate shape bent to be roughly shaped like the English alphabet "L", and may be arranged to face the rear surface of the center portion of the bridge 720. One end of the ground bracket 731 may come into contact with the center portion of the rear surface of the bridge 720. The other end of the ground bracket 731 may protrude toward the rear of the bridge 720, and may be connected to the ground connector. The ground bracket 731 may be made of a conductive material such as copper, aluminum, steel, nickel, and the like for electrical connection with the display module 200 and the ground connector.

The anti-rotation hook 732 may extend from the ground bracket 731, and may be fixed to the bridge 720. The anti-rotation hook 732 may function as an element that supports the ground bracket 731 on the bridge 720 and prevents relative rotation of the ground bracket 731 against the bridge 720. The anti-rotation hook 732 may protrude toward the bridge 720 from one end of the ground bracket 731 facing the center portion of the bridge 720. The anti-rotation hook 732 may come in various types of hook shapes with ends thereof bent into a loop shape. When one end of the ground bracket 731 comes into contact with the center portion of the bridge 720, the anti-rotation hook 732 may be inserted into the bridge 720, and may be latch-coupled to the bridge 720.

The ground screw 733 may penetrate the ground bracket 731, and may be connected to the display module 200. That is, the ground screw 733 may function as an element that electrically connects the ground bracket 731 and the display module 200. Other than the bolt shape illustrated in FIG. 9, shapes of the ground screw 733, which is capable of penetrate the ground bracket 731, may vary with a change to its design. The ground screw 733 may be made of a conductive material such as copper, aluminum, steel, nickel, and the like for electrical connection with the display module 200 and the ground bracket 731. One end of the ground screw 733 may penetrate the ground bracket 731 to be inserted into the internal space of the bridge 720, and may be coupled to the rear portion of the display panel 210.

Hereinafter, a manufacturing method of the display apparatus according to an embodiment of the present disclosure will be described.

Figure 10:
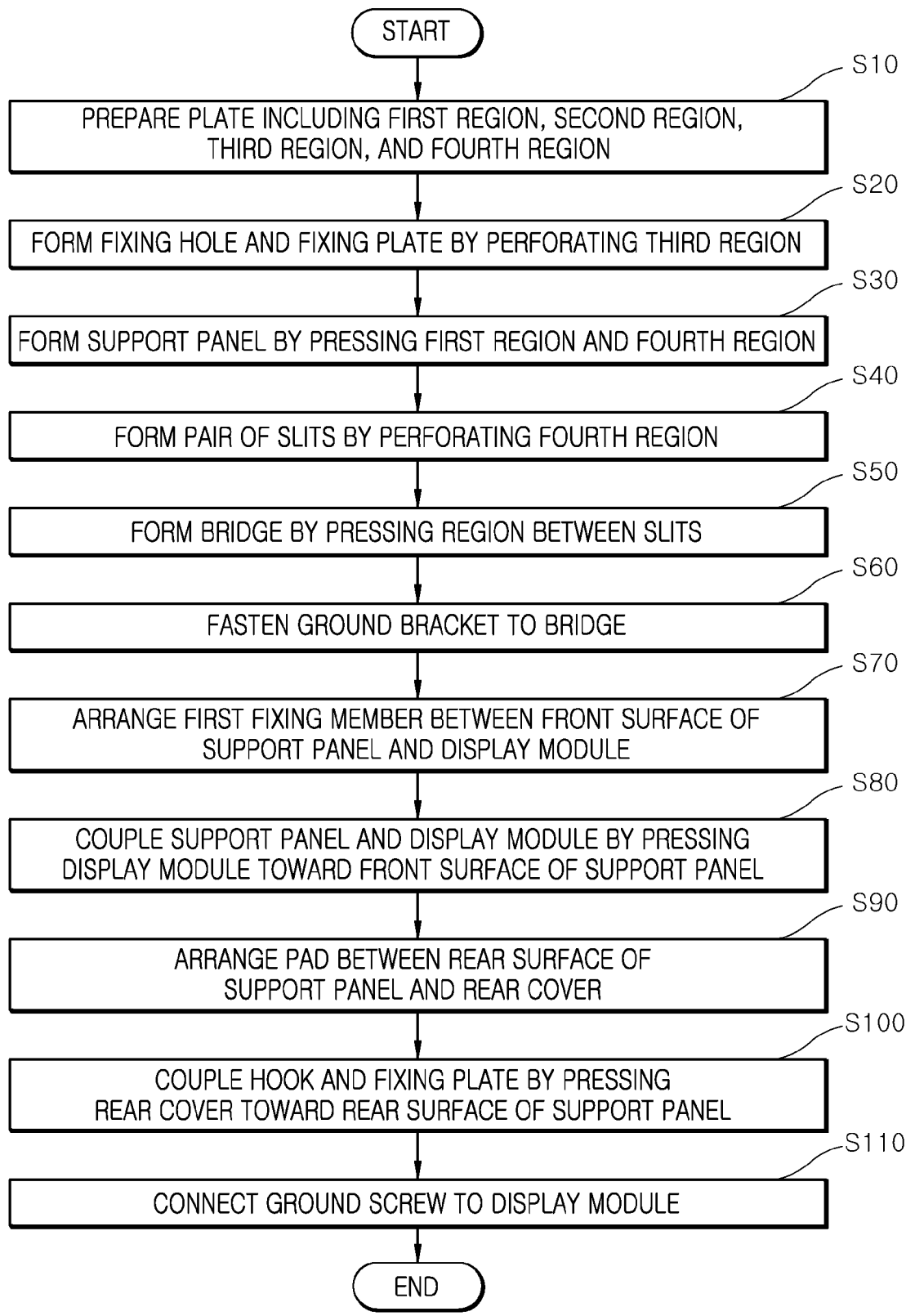
FIG. 10 is a flowchart schematically illustrating the sequence of a manufacturing method of the display apparatus according to an embodiment of the present disclosure.

FIG. 10 is a flowchart schematically illustrating the sequence of a manufacturing method of the display apparatus according to an embodiment of the present disclosure.

FIGS. 11 to 18 are views schematically illustrating the manufacturing method of the display apparatus.

Figure 11:
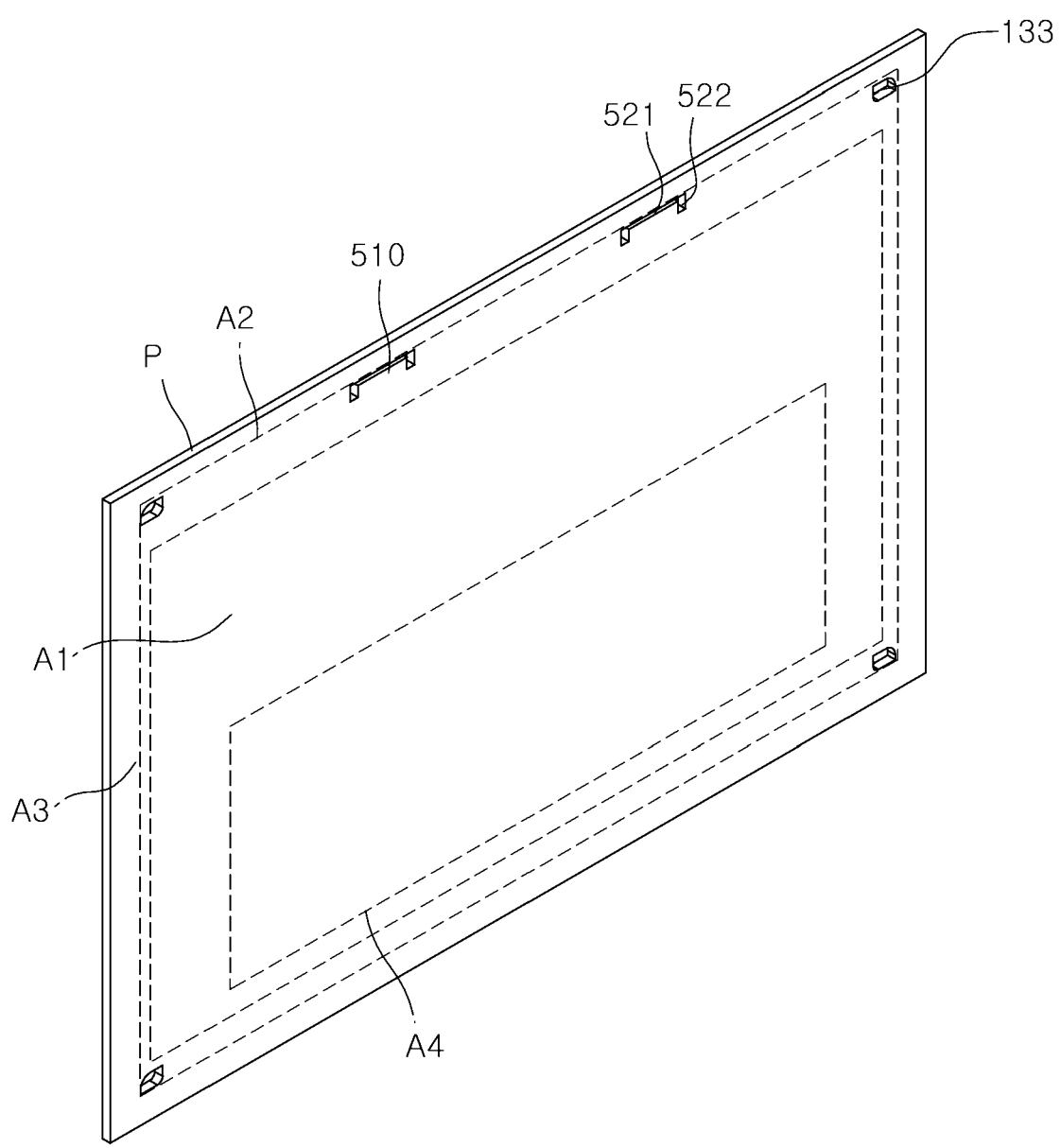
FIGS. 11 to 18 are views schematically illustrating the manufacturing method of the display apparatus.

Referring to FIGS. 10 and 11, a plate P may be first prepared for manufacturing the support panel 100 (S10). The plate P may be a flat plate having roughly a square shape.

The plate P may include a first region A1, a second region A2, and a third region A3.

The first region A1 is a region for machining the first panel 110, and may be arranged in the center portion of the plate P out of the entire region of the plate P. The first region A1 may have a smaller area than the plate P.

The second region A2 is a region for machining the second panel 120, and may be arranged in the edge region of the plate P out of the entire region of the plate P. The second region A2 may extend along the edge of the plate P, and may be arranged to surround the entire perimeter of the first region A1. The second region A2 may be arranged to be spaced predetermined distances apart from each other.

The third region A3 is a region for machining the third panel 130, and may be arranged between the first region A1 and the second region A2.

A fourth region A4 for machining the third panel 140 may be formed in the first region A1 of the plate P. The fourth region A4 may be formed to have a smaller area than the first region A1, and may be arranged inside the first region A1.

After step S10, the third region A3 may be perforated to form the fixing hole 520 and the fixing plate 510 in the third region A3 (S20). Step S20 may be performed by various types of perforating devices, such as a punching press, and the like. In step S20, the notching hole 133 may be formed on a corner of the third region A3.

After step S20, the first region A1 and the fourth region A4 may be pressed to form the support panel 100 (S30).

Figure 12:
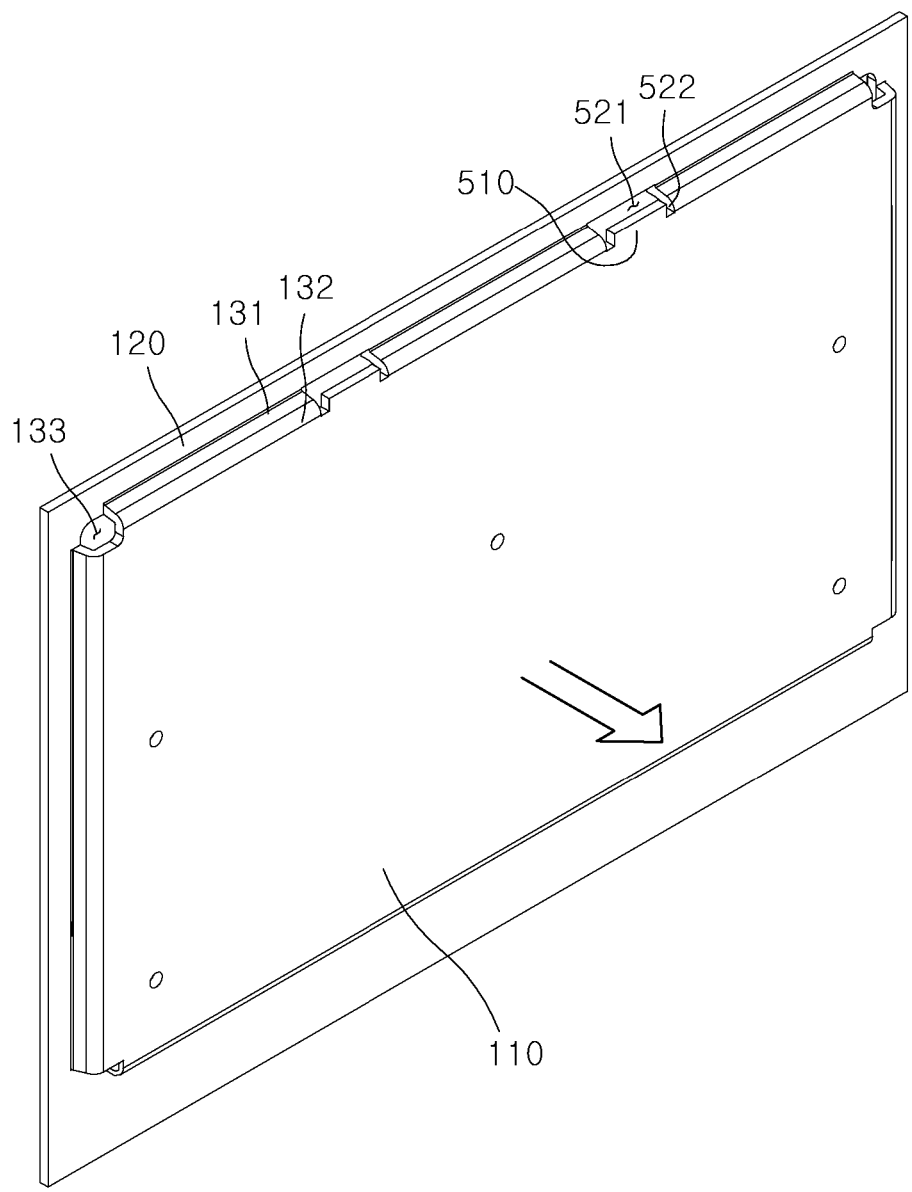
Figure 13:
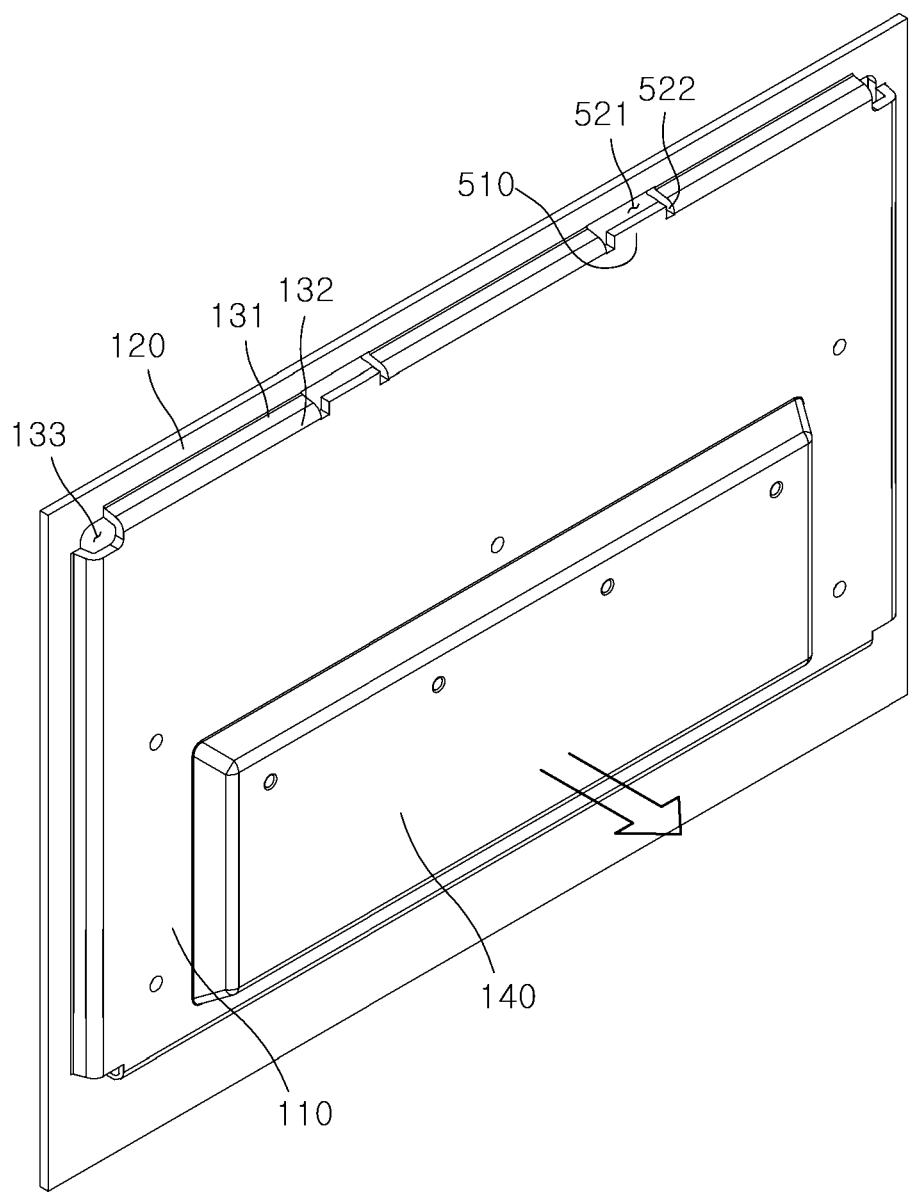

Referring to FIGS. 12 and 13, a detailed description of step S30 is as follows: The front surface of the first region A1 may be pressed backward. Accordingly, the first region A1 may be relatively moved backward with respect to the second region A2, and the first panel 110 and the second panel 120 may be formed.

Simultaneously, the third region A3 may be deformed into a rounded shape with a predetermined curvature by the backward movement of the second region A2, and the connection panel 130 may be formed.

Both side surfaces of the fixing plate 51 may be separated from the connection panel 130 by the extension hole 522. Accordingly, the fixing plate 510 may maintain an initial shape thereof, and may be moved backward with the first panel 110. An end of the fixing plate 510 may be arranged inside the insertion hole 521.

Then, the front surface of the fourth region A4 may be pressed backward. Accordingly, the fourth region A4 may be relatively moved backward with respect to the first region A1, and the third panel 140 may be formed.

Step S30 may be performed by various types of press devices capable of performing a drawing process.

Figure 14:
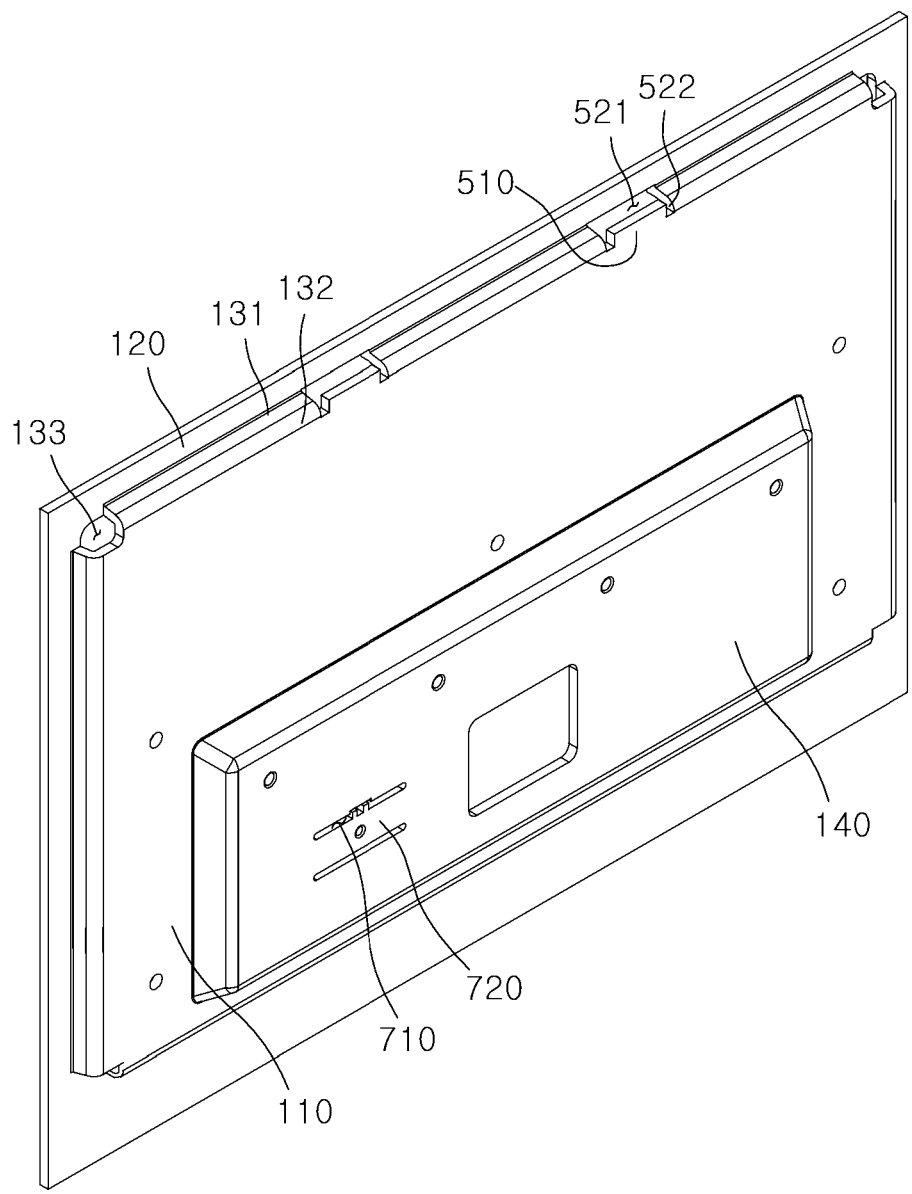

Referring to FIG. 14, after step S30, the fourth region A4, that is, the third panel 140, may be perforated to form a pair of the slits 710 (S40).

Figure 15:
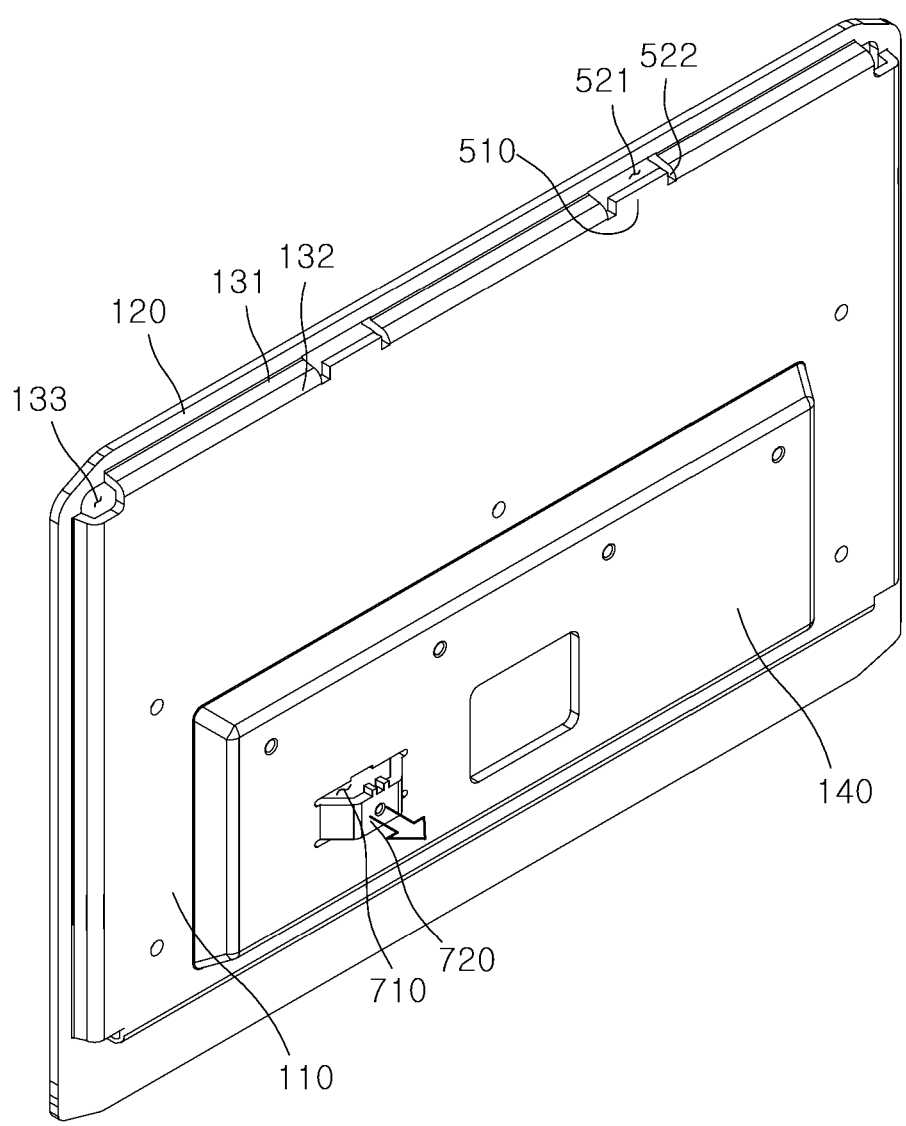

Referring to FIG. 15, after step S40, the front surface of the third panel 140 located between the pair of the slits 710 may be pressed backward to form the bridge 720 (S50).

Figure 16:
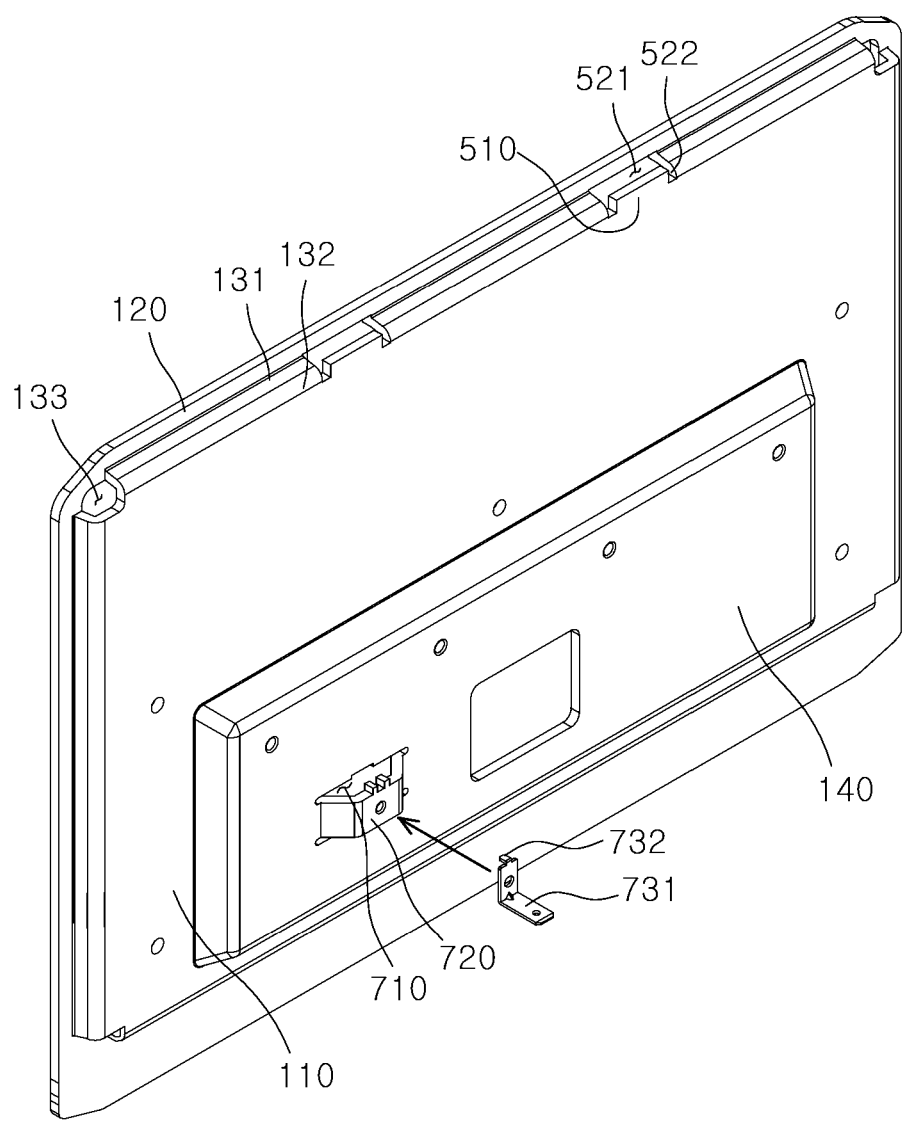

Referring to FIG. 16, the ground bracket 731 may be fastened to the bridge 720 (S60).

More specifically, in step S60, an operator may bring one end of the ground bracket 731 into contact with the rear surface of the center portion of the bridge 720 protruding toward the rear of the third panel 140.

One end of the ground bracket 731 may come into contact with the bridge 720. Accordingly, the anti-rotation hook 732 configured to extend from the ground bracket 731 may be inserted inside the bridge 720, and may be latch-coupled to the bridge 720.

The ground bracket 731 may be fixed to the bridge 720 by a force of the coupling between the bridge 720 and the anti-rotation hook 732.

Figure 17:
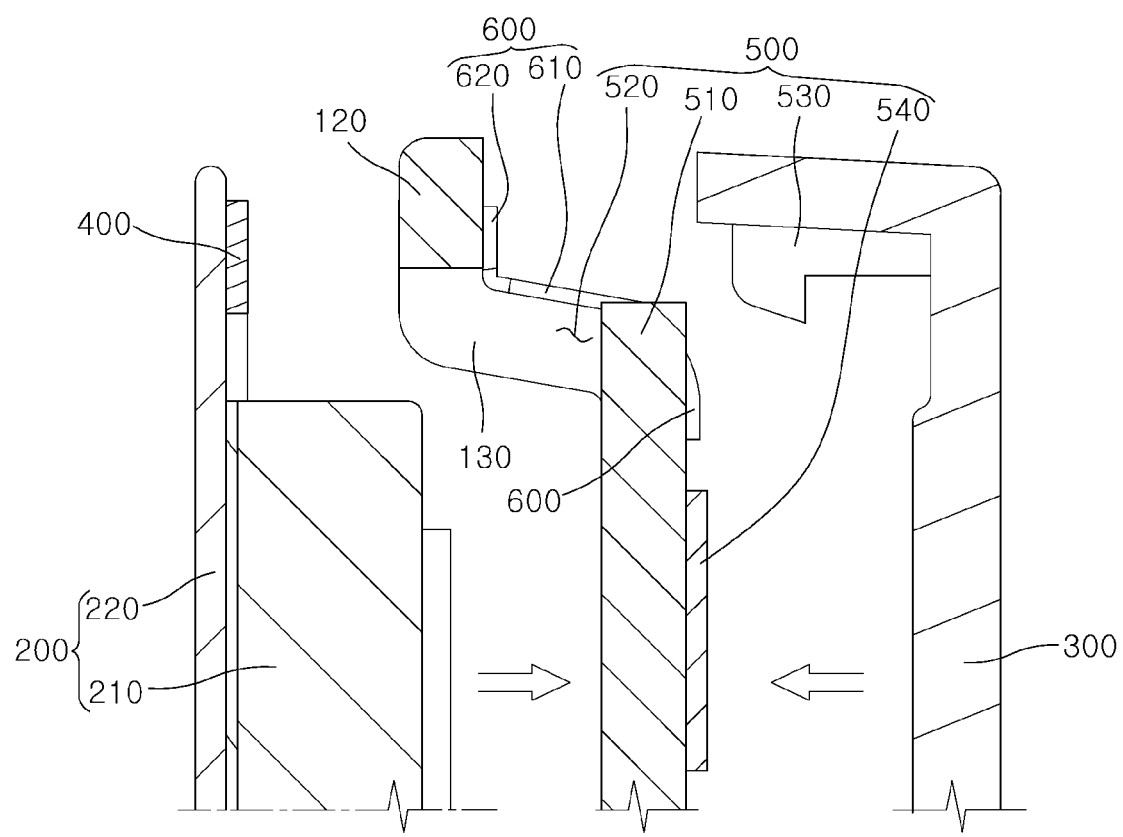

Referring to FIG. 17, after step S60, the first fixing member 400 may be arranged between the front surface of the support panel 100 and the display module 200 (S70). In step S70, the first fixing member 400 may be arranged between the second panel 120 and the cover glass 220. As illustrated in FIG. 17, the front surface of the first fixing member 400 is attached to the rear surface of the cover glass 220. Accordingly, the first fixing member 400 may be arranged between the second panel 120 and the cover glass 220.

Then, the display module 200 may be pressed toward the front surface of the support panel 100 to couple the support panel 100 and the display module 200 (S80). With the display panel 210 seated on the front surface of the first panel 110, both sides of the first fixing member 400 may be attached to the front surface of the second panel 120 and the rear surface of the cover glass 220, respectively.

After step S80, the pad 600 may be arranged between the rear surface of the support panel 100 and the rear cover 300 (S90). In step S90, the inner surface of the anti-snag pad 620 may come into contact with the outer surface of the connection panel 130. The outer surface of the sealing pad 620 may come into contact with the rear surface of the second panel 120.

Then, the rear cover 300 may be pressed toward the rear surface of the support panel 100 to couple the hook 530 and the fixing plate 510 (S100). In step S100, the outer surface of the anti-snag pad 610 may be pressed, by the pressurization rib 310, in a direction toward the connection panel 130. Both sides of the anti-snag pad 610 may then be brought into close contact with the connection panel 130 and the pressurization rib 310, respectively.

Figure 18:
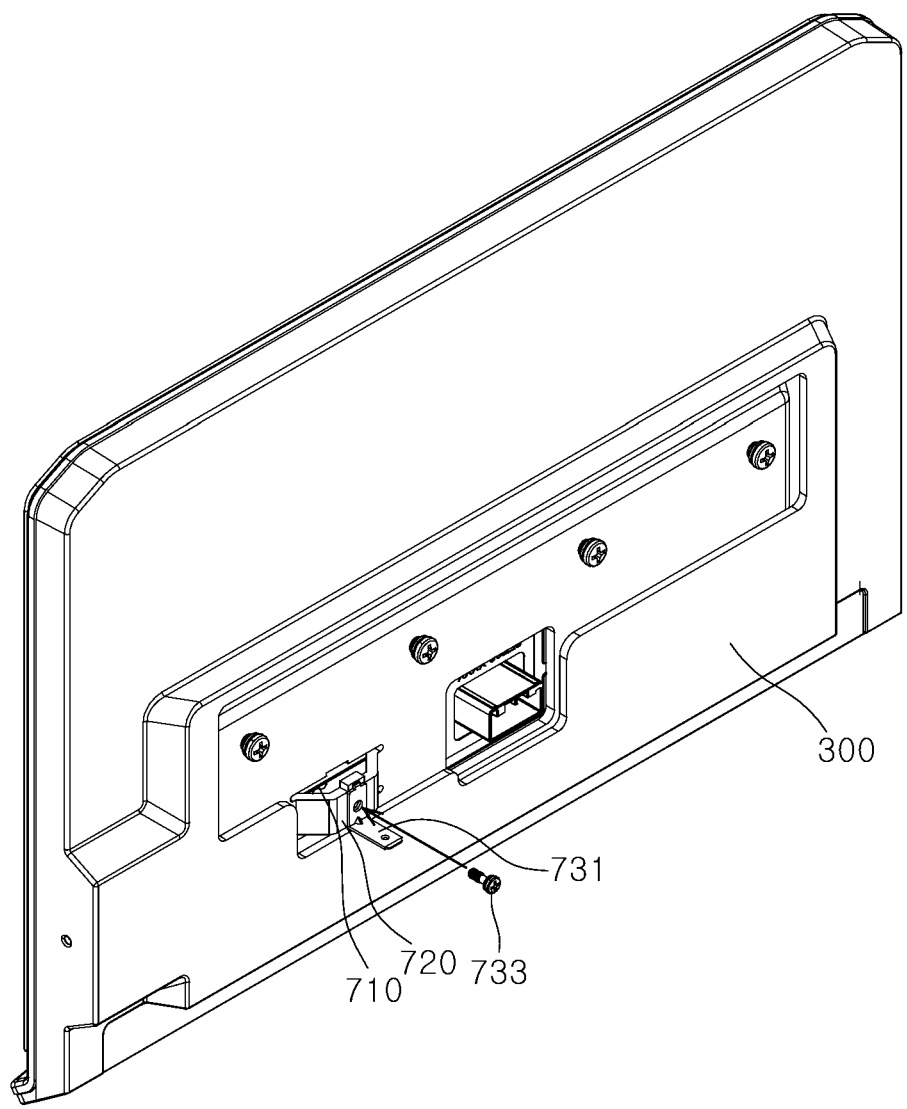

Referring to FIG. 18, after step S100, the ground screw 723 may be connected to the display module 200 (S110). In step S110, one end of the ground screw 733 may sequentially penetrate the ground bracket 731 and the bridge 720 to be coupled into the rear surface of the display panel 210. The example above shows that step S110 is performed after step S100, but it is also possible that step S110 is performed after step S70.

The present disclosure has been described with reference to the embodiments illustrated in the drawings, but these are only exemplary. Those skilled in the art to which the technology pertains should understand that various modifications and other equivalent embodiments may be made without departing from the spirit and scope of the disclosure as defined in the following claims.

Therefore, the technical protection scope of the present disclosure will be determined by the following claims.

What is claimed is:

1. A display apparatus comprising:
   a support panel comprising a first panel, a second panel spaced apart from the first panel, and a connection panel arranged between the first panel and the second panel;
   a display module arranged to face a front surface of the support panel;
   a rear cover arranged to face a rear surface of the support panel;

a first fixing member provided between the support panel and the display module and configured to fix the display module to the support panel; and a second fixing member provided between the support panel and the rear cover and configured to fix the rear cover to the support panel, wherein the second fixing member comprises: a fixing plate configured to extend from the first panel; a fixing hole configured to penetrate the connection panel and surround the fixing plate; and a hook configured to extend from the rear cover, inserted into the fixing hole, and latch-coupled to the fixing plate.

2. The display apparatus of claim 1, wherein the display module comprises:
a display panel configured to face the second panel; and
a cover glass stacked on the display panel and configured to face the first panel, and
wherein the first fixing member is arranged between the cover glass and the second panel, and opposing sides of the first fixing member are attached to the cover glass and the second panel, respectively.

3. The display apparatus of claim 1, wherein the first panel is arranged behind the second panel, and
wherein the connection panel comprises:
a first connection panel connected to the second panel; and
a second connection panel configured to extend from the first connection panel and connected to the first panel.

4. The display apparatus of claim 3, wherein the fixing hole comprises:
an insertion hole configured to penetrate the first connection panel; and
an extension hole configured to extend from the insertion hole and configured to penetrate the second connection panel.

5. The display apparatus of claim 4, wherein an end of the fixing plate is arranged inside the insertion hole.

6. The display apparatus of claim 4, wherein a pair of the extension holes are provided, and the pair of the extension holes are arranged on opposite side surfaces of the fixing plate, respectively.

7. The display apparatus of claim 1, wherein the hook is provided to be elastically deformable.

8. The display apparatus of claim 1, wherein the second fixing member further comprises:
a fixing tape arranged between the first panel and the rear cover, and opposite sides of the fixing tape are attached to the first panel and the rear cover, respectively.

9. The display apparatus of claim 1, wherein the display apparatus further comprises:
a pad arranged between the support panel and the rear cover and provided to be elastically deformable.

10. The display apparatus of claim 9, wherein the pad comprises:
an anti-snag pad; and a sealing pad configured to extend from the anti-snag pad and being in contact with the second panel.

11. The display apparatus of claim 1, wherein the support panel further comprises:
a third panel protruding backward from the front surface of the first panel, and
wherein the display apparatus further comprises:
a pair of slits configured to penetrate the third panel;
a bridge arranged between the pair of the slits and configured to protrude backward from the front surface of the third panel; and
a ground member fixed to the bridge and connected to the display module.

12. The display apparatus of claim 11, wherein the ground member comprises:
a ground bracket arranged to face the bridge;
an anti-rotation hook configured to extend from the ground bracket and fixed to the bridge to prevent rotation of the ground bracket; and
a ground screw configured to penetrate the ground bracket and connected to the display module.

13. A manufacturing method of a display apparatus comprising:
preparing a plate comprising a first region, a second region arranged to surround the first region, and a third region arranged between the first region and the second region;
forming a fixing hole and a fixing plate by perforating the third region;
forming a support panel by pressing the first region;
arranging a first fixing member between a front surface of the support panel and a display module;
coupling the support panel and the display module by pressing the display module toward the front surface of the support panel;
arranging a pad between a rear surface of the support panel and a rear cover; and
coupling a hook and the fixing plate by pressing the rear cover toward the rear surface of the support panel.

14. The manufacturing method of claim 13, further comprising:
after forming the support panel by pressing the first region,
forming a pair of slits by perforating a fourth region located inside the first region;
forming a bridge by pressing a region between the pair of the slits; and
fastening a ground bracket to the bridge.

15. The manufacturing method of claim 13, further comprising:
after coupling the support panel and the display module, connecting a ground screw to the display module.

* * * * *